United States Patent
Kitajima

(10) Patent No.: US 7,112,931 B2
(45) Date of Patent: Sep. 26, 2006

(54) MOTOR CONTROL DEVICE AND MOTOR CONTROL METHOD

(75) Inventor: Yasuhiko Kitajima, Kamakura (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/971,084

(22) Filed: Oct. 25, 2004

(65) Prior Publication Data

US 2005/0088136 A1     Apr. 28, 2005

(30) Foreign Application Priority Data

Oct. 28, 2003   (JP)   ............................ P2003-367602

(51) Int. Cl.
    *H02K 33/00* (2006.01)
(52) U.S. Cl. ............. 318/114; 318/727; 318/801; 318/798; 318/803; 318/807
(58) Field of Classification Search ............... 318/114, 318/727, 801, 798, 803, 811, 807
    See application file for complete search history.

(56) References Cited

U.S. PATENT DOCUMENTS 4,620,143 A * 10/1986 Matty ................... 318/811
2004/0108824 A1 * 6/2004 Ueda et al. ............. 318/114

FOREIGN PATENT DOCUMENTS

JP        2001-314095       11/2001

* cited by examiner

*Primary Examiner*—Karen Masih
(74) *Attorney, Agent, or Firm*—McDermott Will & Emery LLP

(57) ABSTRACT

An inverter supply voltage generator comprises an inverter supply voltage computing unit 10, a voltage converter 11 and a battery 12. The inverter supply voltage generator varies inverter supply voltage Vdc in synchronization with motor-application voltages Vu_pwm, Vv_pwm, and Vw_pwm. Thus, the degree of freedom of the switching operation of a PWM inverter 13 is increased, an inverter loss and the size of the PWM inverter 13 can be reduced, and its efficiency can be enhanced without deteriorating the driving efficiency of an IPM motor 14.

7 Claims, 9 Drawing Sheets

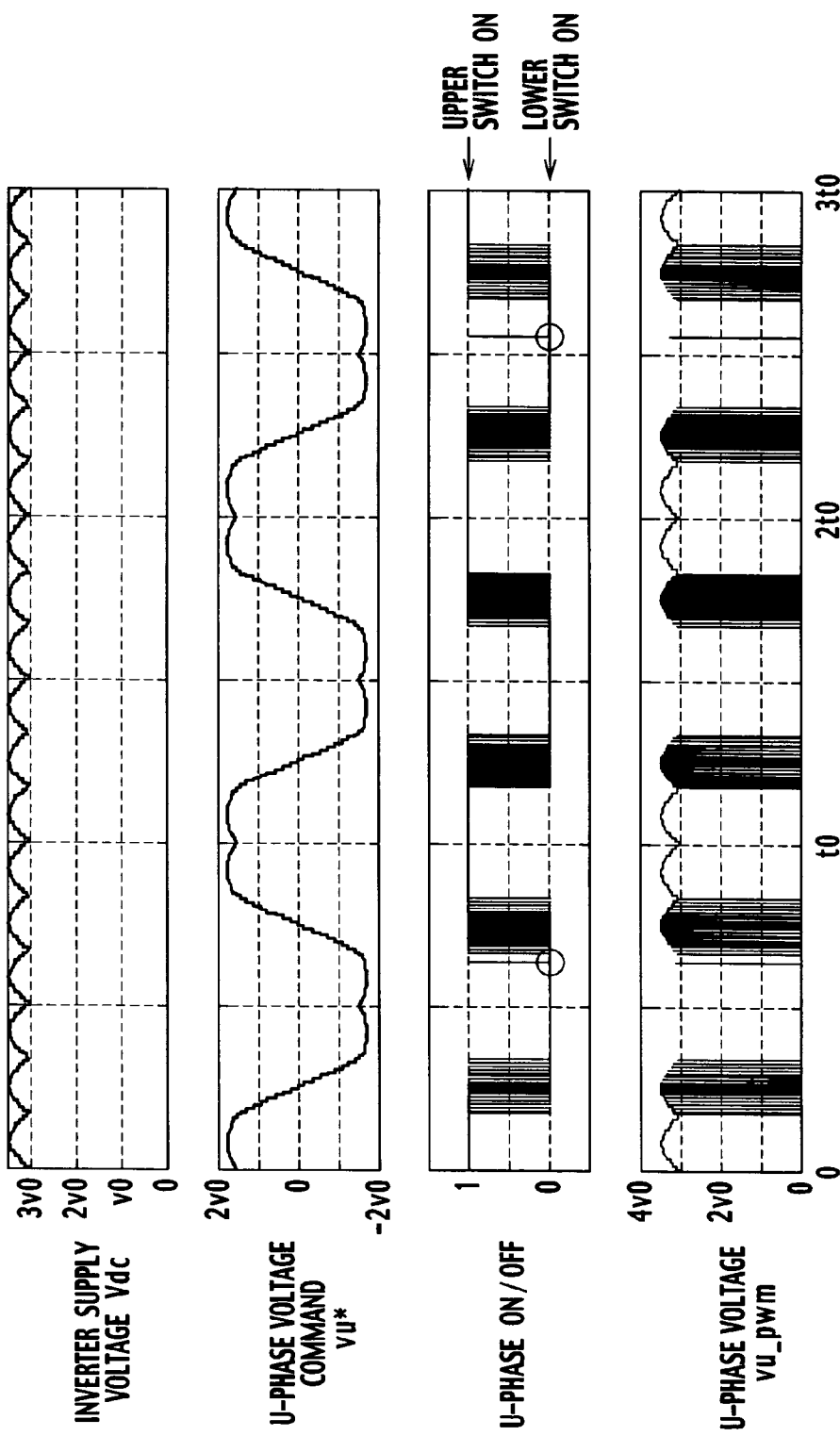
FIG. 4A  INVERTER SUPPLY VOLTAGE Vdc
FIG. 4B  U-PHASE VOLTAGE COMMAND vu*
FIG. 4C  U-PHASE ON/OFF
FIG. 4D  U-PHASE VOLTAGE vu_pwm U-PHASE VOLTAGE COMMAND
$v_u^*$ U-PHASE CURRENT
$i_u$ DC LINK CURRENT
$i_{dc}$
(PRESENT INVENTION)

DC LINK CURRENT
$i_{dc}$
(CONVENTIONAL TECHNIQUE)

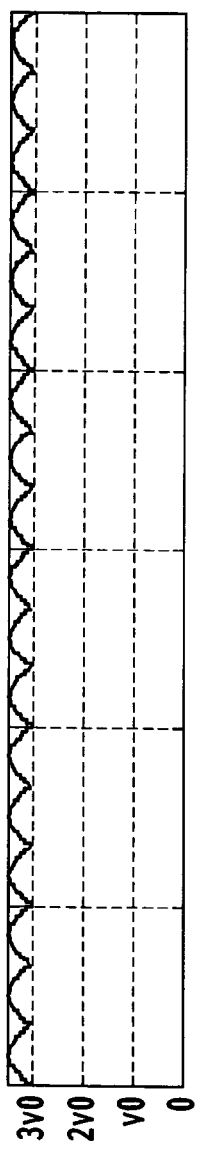
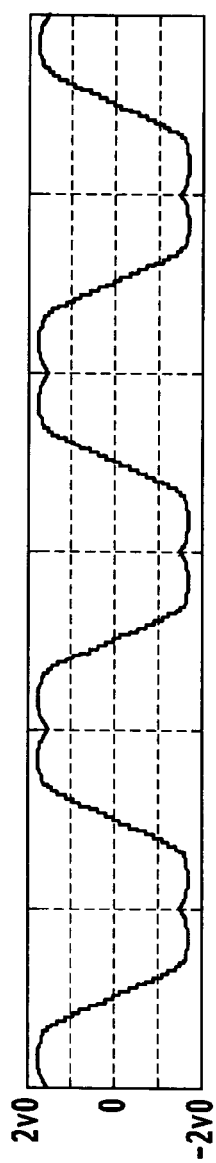
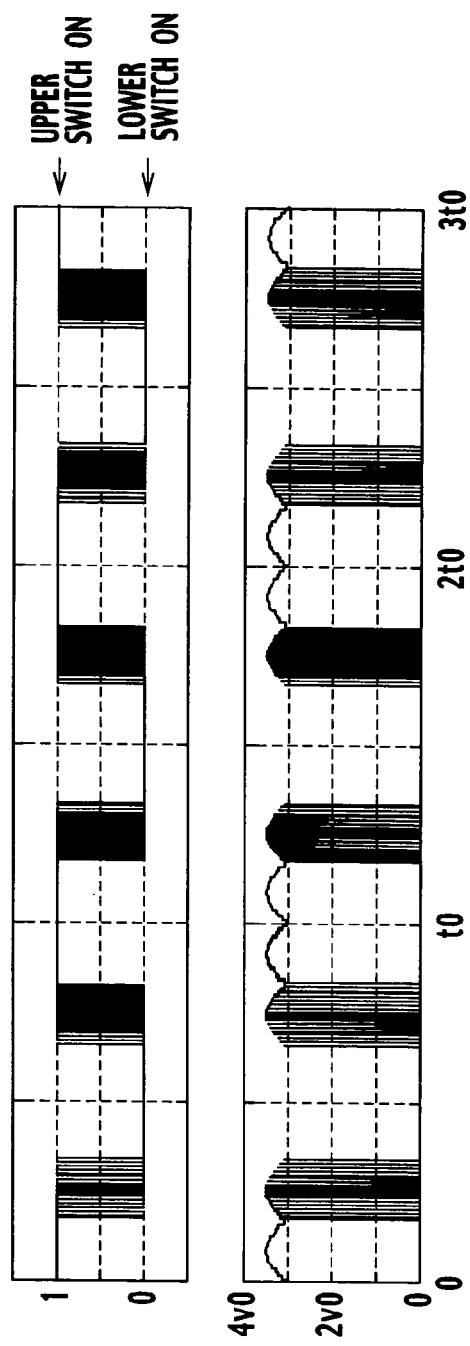
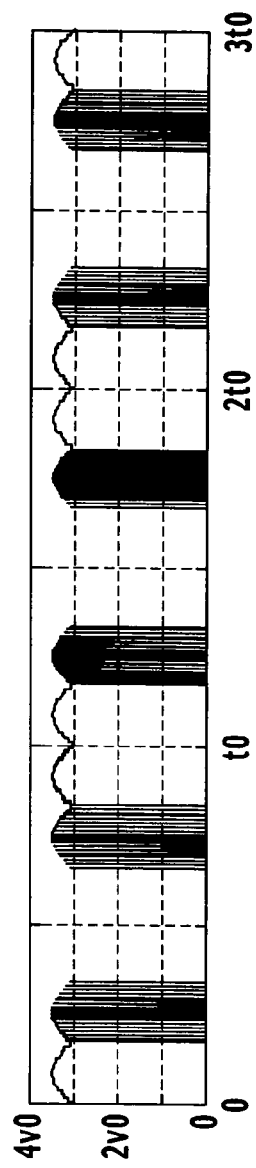
FIG. 7A  INVERTER SUPPLY VOLTAGE Vdc
FIG. 7B  U-PHASE VOLTAGE COMMAND vu*
FIG. 7C  U-PHASE ON/OFF
FIG. 7D  U-PHASE VOLTAGE vu_pwm

MOTOR CONTROL DEVICE AND MOTOR CONTROL METHOD

BACKGROUND OF THE INVENTION

The present invention relates to a motor control device and a motor control method which control an output of a motor by controlling DC input voltage of an inverter which applies voltage to the motor. More specifically, the invention relates to a technique for reducing an inverter loss and an inverter size and enhancing the efficiency of the inverter without deteriorating the driving efficiency of the motor.

Conventionally, as disclosed in Japanese Patent Application Laid-Open No. 2001-314095, there is a known motor control device which controls a rotation speed of a motor by switching between a region where PWM (Pulse Wide Modulation) control is performed in a state where the DC input voltage of an inverter is maintained at a constant voltage, and a region where PAM (Pulse Amplitude Modulation) control is performed while varying the DC input voltage of the inverter by a pressure rising circuit, according to a driving state of the motor. According to such a motor control device, the motor can be driven under an optimal condition according to the operating state of the motor, and the motor can be operated efficiently with small vibration.

SUMMARY OF THE INVENTION

When the PWM control is performed in a state where the DC input voltage of the inverter is maintained at a constant voltage, however, in order to reduce a ripple current of the motor, a switching frequency of the inverter must be increased. Therefore, a ratio occupied by switching loss in the entire inverter loss is increased. Further, as the PWM control is performed, the ripple current appearing in a DC bus of the inverter is increased.

On the other hand, when the PAM control is performed while varying the DC input voltage of the inverter using a pressure rising circuit, although the switching frequency of the inverter can be suppressed to a low level, the ripple current of the motor is increased, and the response of the current control is deteriorated as compared with the PWM control. Further, the driving efficiency is deteriorated depending upon motors in some cases.

Due to such a technical background, the conventional motor control device faces difficulties in reducing the inverter loss and the inverter size and enhancing the efficiency thereof without deteriorating the driving efficiency of the motor.

The present invention has been accomplished to solve the above problem, and it is an object of the invention to provide a motor control device and a motor control method that reduce an inverter loss and an inverter size and enhance the efficiency of the inverter without deteriorating the driving efficiency of the motor.

To solve the above problem, the present invention provides a motor control device which controls an output of a motor by controlling a DC input voltage of an inverter which applies voltage to the motor, the motor control device comprising: an inverter supply voltage generator which varies the DC input voltage in synchronization with the output voltage of the inverter. To solve the above problem, the invention also provides a motor control method for controlling an output of a motor by controlling a DC input voltage of an inverter which applies voltage to the motor, the motor control method comprising the step of varying the DC input voltage in synchronization with an output voltage of the inverter.

BRIEF DESCRIPTION OF THE DRAWINGS

FIGS. 4A–4D are a simulation waveform diagram showing a state where a U-phase voltage command value, ON/OFF control of a U-phase switching element and U-phase output voltage are varied according to the inverter supply voltage;

FIGS. 7A–7D are a simulation waveform diagram showing a state where the U-phase voltage command value, ON/OFF control of a U-phase switching element and U-phase output voltage are varied according to the inverter supply voltage;

DETAILED DESCRIPTION OF THE PREFERRED EMBODIMENTS

Figure 1:
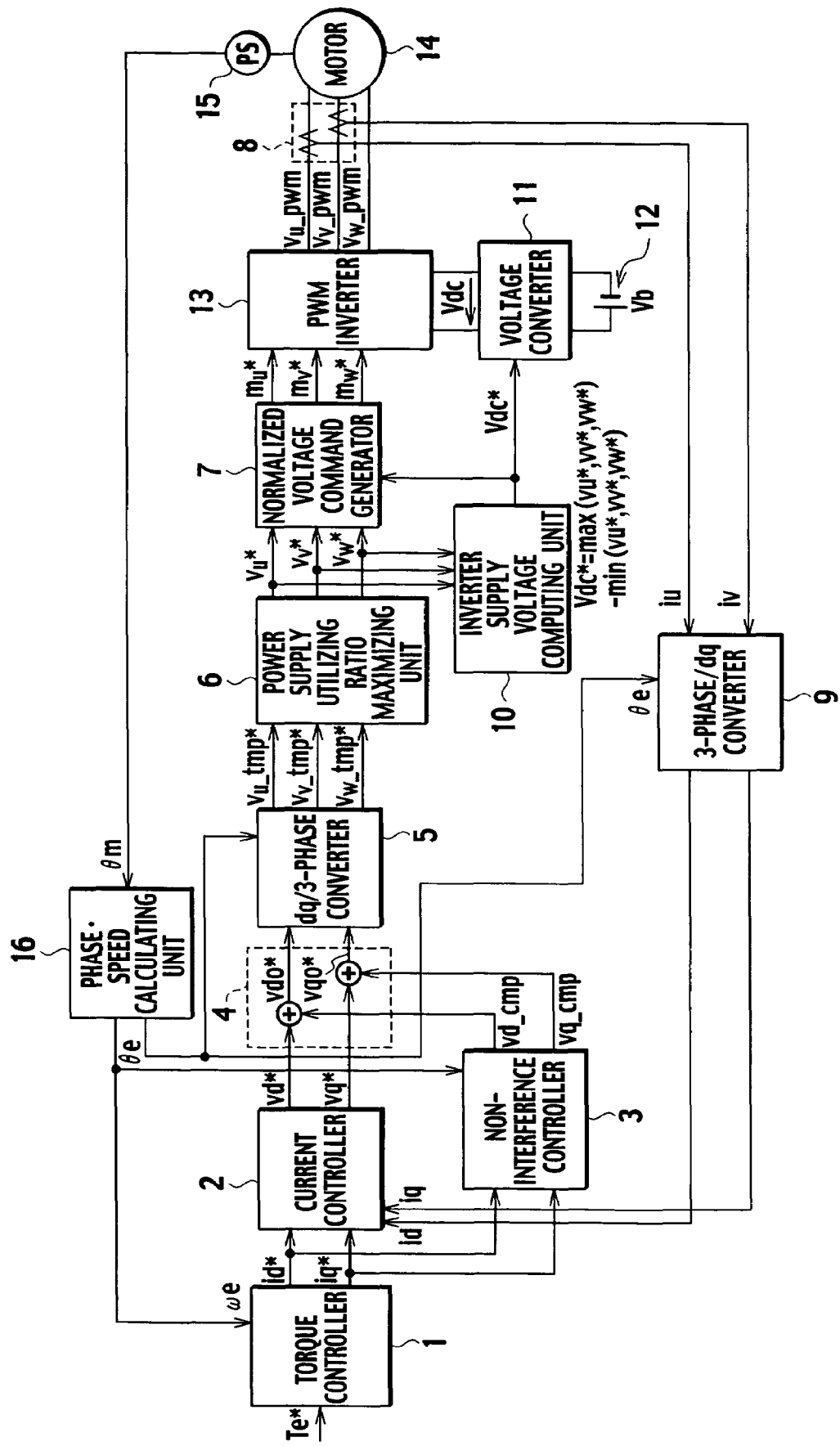
FIG. 1 is a block diagram showing a structure of a vector control system according to a first embodiment of the present invention.

A motor control device of the present invention can be applied to a vector control system of an interior permanent magnet motor (IPM motor) as shown in FIG. 1. The IPM motor is an AC motor in which a permanent magnet instead of a coil is embedded in a rotor which is mounted on a driving shaft and which rotates. The IPM motor can be used as a power source of an electric vehicle, for example. Structures and operations of vector control systems according to first to third embodiments of the invention will be explained with reference to the drawings.

First Embodiment

First, referring to FIGS. 1 to 5, the structure and operation of the vector control system according to the first embodiment of the invention will be explained.

Structure of Vector Control System

As shown in FIG. 1, the vector control system according to the first embodiment of the invention includes: a torque control system constituted by a torque controller 1; a current control system including a current controller 2, a noninterference controller 3, an adder 4, a dq/3-phase converter 5, a power supply utilizing ratio maximizing unit 6, a normalized voltage command generator 7, a current detector 8, and a 3-phase/dq converter 9; an inverter supply voltage generator including an inverter supply voltage computing unit 10, a voltage converter 11, and a battery 12; a PWM inverter 13; an IPM motor; a motor rotation angle detector (PS) 15; and a phase/speed calculating unit 16.

The torque controller 1 generates a d-axis current command value id* and a q-axis current command value iq* of the IPM motor 14 based on a torque command Te* and a motor rotation speed ωe input from the phase/speed calculating unit 16. The torque controller 1 inputs these generated current command values id* and iq* to the current controller 2 and the noninterference controller 3.

The current controller 2 carries out PI (proportion/integration) computation such that actual currents id and iq of the d-axis and q-axis agree with the d-axis current command value id* and the q-axis current command value iq*, thereby generating voltage command values vd* and vq* of the d-axis and q-axis, and inputs the generated voltage command values vd* and vq* to the adder 4.

The noninterference controller 3 utilizes the current command values id* and iq* which are input from the torque controller 1, and calculates d-axis compensation voltage vd_cmp and q-axis compensation voltage vq_cmp which are voltage components used for compensating interference terms of the d-axis and q-axis, and inputs the calculated compensation voltages vd_cmp and vq_cmp to the adder 4.

The adder 4 adds the voltage command values vd* and vq* which are input from the current controller 2 and the noninterference controller 3 to the compensation voltages vd_cmp and vq_cmp to calculate voltage command values vdo* and vqo* of the d-axis and q axis, and inputs the calculated voltage command values vdo* and vqo* to the dq/3-phase converter 5.

The dq/3-phase converter 5 converts voltage command values vdo* and vqo* which are input from the adder 4 into phase voltage command values vu_tmp*, vv_tmp*, and vw_tmp* based on a phase θe of a dq coordinate system as viewed from a 3-phase AC coordinate system which is input from the phase/speed calculating unit 16. The dq/3-phase converter 5 inputs the phase voltage command values vu_tmp*, vv_tmp*, and vw_tmp* to the power supply utilizing ratio maximizing unit 6.

The power supply utilizing ratio maximizing unit 6 maximizes the voltage to be applied to the IPM motor 14 for a predetermined inverter supply voltage Vdc with respect to the phase voltage command values vu_tmp*, vv_tmp*, and vw_tmp*, thereby generating phase voltage command values vu*, vv*, and vw*. The power supply utilizing ratio maximizing unit 6 inputs the generated phase voltage command values vu*, vv*, and vw* to the normalized voltage command generator 7 and the inverter supply voltage computing unit 10.

The normalized voltage command generator 7 utilizes the phase voltage command values vu*, vv*, and vw* and the inverter supply voltage command value Vdc* which are input from the power supply utilizing ratio maximizing unit 6 and the inverter supply voltage computing unit 10, and generates signals mu*, mv*, and mw* which correspond to H (high) level output time of U-phase, V-phase, and W-phase of the PWM inverter 13, and inputs the generated signals mu*, mv*, and mw* to the PWM inverter 13.

The current detector 8 detects actual currents iu, and iv of U-phase and V-phase of the IPM motor 14, and inputs the detected actual currents iu, and iv to the 3-phase/dq converter 9. Based on the phase θe of the dq coordinate system as viewed from the 3-phase AC coordinate system which is input from the phase/speed calculating unit 16, the 3-phase/dq converter 9 converts the actual currents iu, iv, and iw (=−iu−iv) of the IPM motor 14 into actual currents id and iq of the d-axis and q-axis, and inputs the actual currents id and iq to the current controller 2.

Based on the phase voltage command values vu*, vv*, and vw* which are input from the power supply utilizing ratio maximizing unit 6, the inverter supply voltage computing unit 10 produces a command value Vdc* of the inverter supply voltage Vdc optimal for generating the voltage to be applied to the IPM motor 14, and inputs the produced inverter supply voltage command value Vdc* to the normalized voltage command generator 7 and the voltage converter 11. A concrete producing method of the inverter supply voltage command value Vdc* will be described later.

Figure 2:
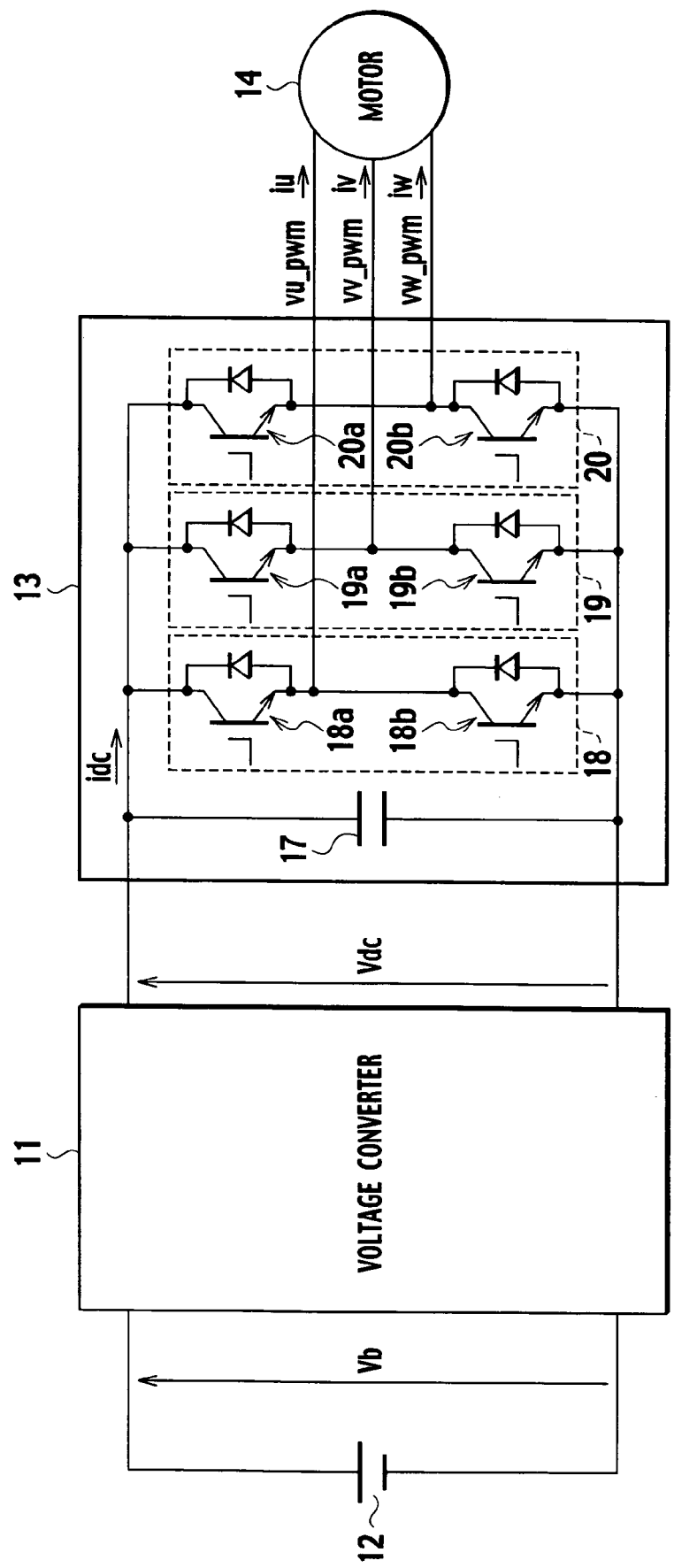
FIG. 2 is a schematic diagram showing a configuration of a PWM inverter shown in FIG. 1.

The voltage converter 11 generates inverter supply voltage Vdc from the battery voltage 12 such that it agrees with the inverter supply voltage command value Vdc* which is input from the inverter supply voltage computing unit 10. The voltage converter 11 inputs the generated inverter supply voltage Vdc to the PWM inverter 13 as shown in FIG. 2. As shown in FIG. 2, the battery voltage 12 applies constant voltage Vb to the voltage converter 11.

The PWM inverter 13 performs the PWM control for the inverter supply voltage (DC input voltage) Vdc which is input from the voltage converter 11 according to the signals mu*, mv*, and mw* which are input from the normalized voltage command generator 7, thereby generating voltages Vu_pwm, Vv_pwm, and Vw_pwm to be applied to the motor (motor-application voltages, hereinafter), and applies the generated motor-application voltages (output voltages) Vu_pwm, Vv_pwm, and Vw_pwm to the IPM motor 14.

In this embodiment, the PWM inverter 13 includes a smoothening capacitor 17, and U-phase, V-phase, and W-phase half bridge circuits 18, 19, and 20 as shown in FIG. 2. The half bridge circuits respectively include upper (positive) and lower (negative) switching elements 18a, 18b, 19a, 19b, 20a, and 20b. By switching between ON and OFF of the switching elements of each half bridge circuit, the PWM inverter 13 can control the motor-application voltages Vu_pwm, Vv_pwm, and Vw_pwm.

The IPM motor 14 is driven utilizing the motor-application voltages Vu_pwm, Vv_pwm, and Vw_pwm which are input from the PWM inverter 13. The motor rotation angle detector (PS) 15 detects the rotation angle θm of the IPM motor 14, and inputs the detected rotation angle θm to the phase/speed calculating unit 16. The phase/speed calculating unit 16 computes the rotation speed ωe and the phase θe of the dq coordinate system as viewed from the 3-phase AC coordinate system based on the rotation angle θm input from the motor rotation angle detector 15. The phase/speed calculating unit 16 inputs the computation result to the torque controller 1, the noninterference controller 3, the dq/3-phase converter 5, and the 3-phase/dq converter 9.

Operation of Inverter Supply Voltage Generator

According to the vector control system having such a structure, when the output torque of the IPM motor 14 is to be controlled, if the inverter supply voltage generator and the PWM inverter 13 are operated in the following manner, the number of switching operations of the PWM inverter 13 is reduced and ripple current appearing in the DC bus (DC current, hereinafter) is reduced. Referring to FIGS. 3 to 5, operation of the inverter supply voltage generator and the PWM inverter 13 when controlling the output torque of the IPM motor 14 will be explained.

Figure 3A:
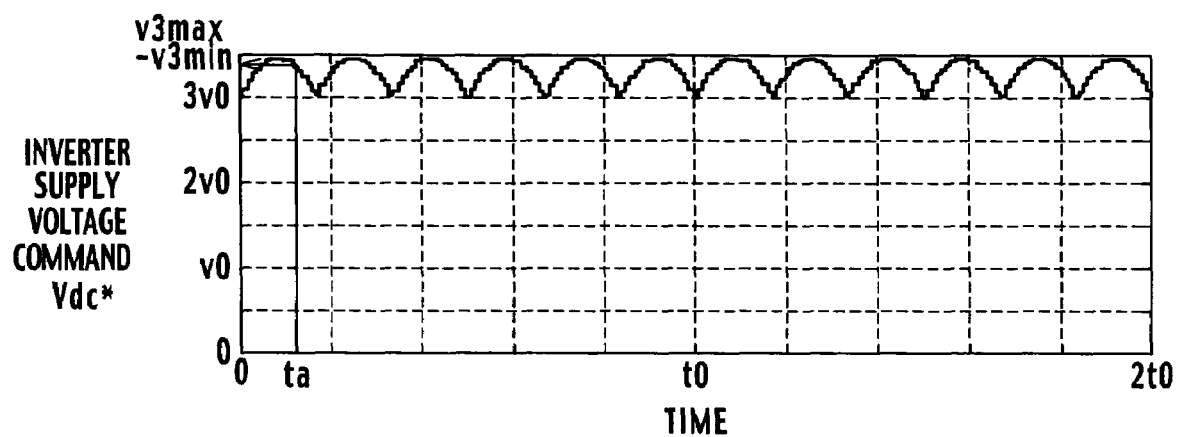
FIGS. 3A, 3B are a simulation waveform diagram showing a state where an inverter supply voltage command value is varied according to a phase voltage command value.
Figure 3B:
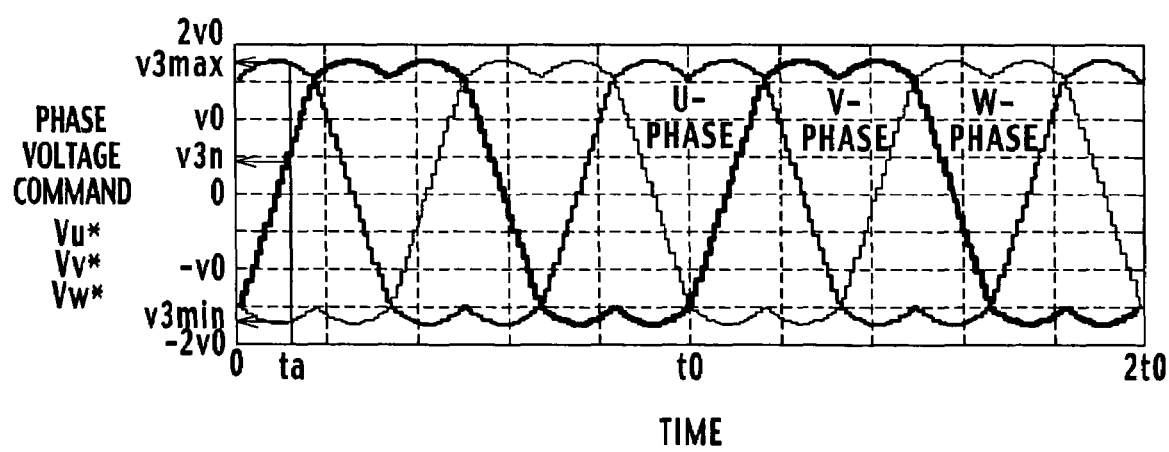
Figure 5A:
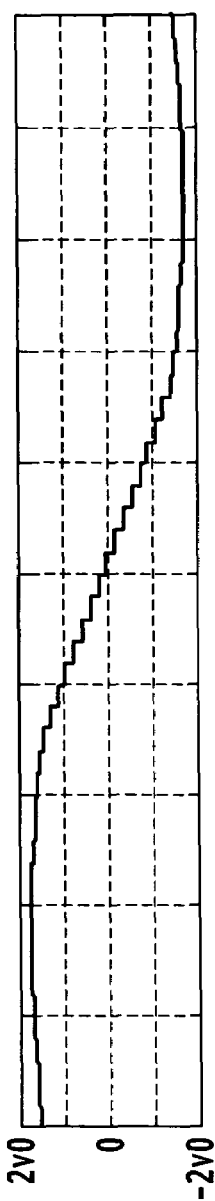
FIGS. 5A–5D are a simulation waveform diagram showing DC link currents of the present invention and of a conventional technique.
Figure 5B:
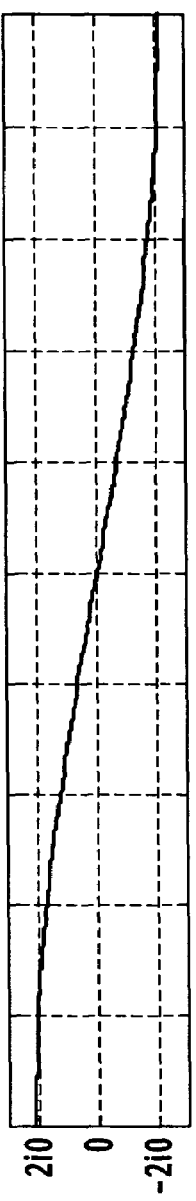
Figure 5C:
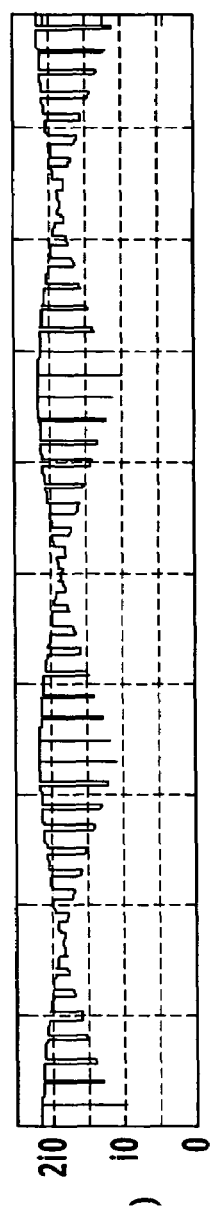
Figure 5D:
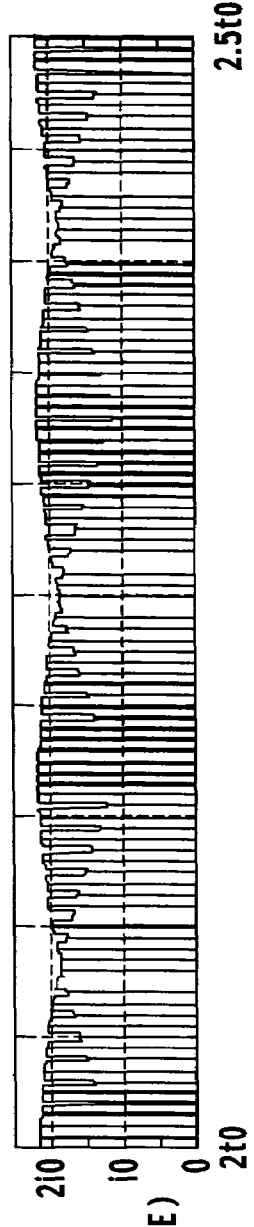

FIGS. 3A, 3B are a simulation waveform diagram showing a state where the inverter supply voltage command value Vdc* (FIG. 3A) is varied according to a phase voltage command values vu*, vv*, and vw* (FIG. 3A). In the following description, only the operation of the inverter supply voltage generator and the PWM inverter 13 at time ta in the drawings will be explained, but the inverter supply voltage generator and the PWM inverter 13 are operated in the same manner also at other time.

As shown in FIG. 3B, the phase voltage command values vu*, vv*, and vw* are increased in the order of the U-phase voltage command value vu*, the V-phase voltage command value vv*, and the W-phase voltage command value vw*. Therefore, the greatest phase voltage command value (greatest value, hereinafter), the second greatest phase voltage command value, and the smallest phase voltage command value (smallest value, hereinafter) are respectively designated with v3max, v3n and v3min. The inverter supply voltage computing unit 10 inputs a difference between the greatest value v3max and the smallest value v3min, i.e., v3max−v3min to the normalized voltage command generator 7 and the voltage converter 11 as an inverter supply voltage command value Vdc*. If the inverter supply voltage Vdc corresponding to the inverter supply voltage command value Vdc* is input from the voltage converter 11, the PWM inverter 13 ON/OFF controls the switching element of the half bridge circuit (half bridge circuit 19 corresponding to the V-phase at time ta) having a phase corresponding to the second greatest phase voltage command value, thereby generating the motor-application voltages Vu_pwm, Vv_pwm, and Vw_pwm.

Referring to FIGS. 4A–4D, the operation of the PWM inverter 13 will further be explained. FIGS. 4A–4D are a simulation waveform diagram showing a state where a U-phase voltage command value vu* (FIG. 4B), ON/OFF control (FIG. 4C) of a U-phase switching element, and U-phase output voltage vu_pwm (FIG. 4D) are varied according to the inverter supply voltage Vdc (FIG. 4A).

The inverter supply voltage computing unit 10 inputs the v3max−v3min as the inverter supply voltage command value Vdc*. Therefore, when the phase voltage command value vu* of the U-phase is the greatest among the three phases, the U-phase switching element maintains ON state, and when the phase voltage command value vu* of the U-phase is the smallest among the three phases, the U-phase switching element maintains the OFF state. On the other hand, when the phase voltage command value vu* of the U-phase is not the greatest or smallest (i.e., second greatest), the inverter supply voltage computing unit 10 controls ON/OFF of the U-phase switching element, thereby generating voltage corresponding to the inverter supply voltage command value vu*. According to this operating method, the number of switching operations can be reduced to ⅓ in each phase of the PWM inverter 13 as compared with the conventional method. As shown in FIGS. 5A–5D, when the motor-application voltages Vu_pwm, Vv_pwm, and Vw_pwm are to be applied to the IPM motor 14, the ripple current appearing in the DC link current (current idc shown in FIG. 2) is largely reduced as compared with the conventional technique.

As apparent from the above explanation, according to the vector control system of the first embodiment of the invention, the inverter supply voltage generator varies the inverter supply voltage Vdc in synchronization with the motor-application voltages Vu_pwm, Vv_pwm, and Vw_pwm. According to such a structure, since the degree of freedom of the switching operation of the PWM inverter 13 is increased, the inverter loss and the size of the PWM inverter 13 can be reduced, and its efficiency can be enhanced without deteriorating the driving efficiency of the IPM motor 14.

In the vector control system according to the first embodiment of the invention, the inverter supply voltage generator varies the inverter supply voltage Vdc according to the difference between the greatest and smallest instantaneous values of the motor-application voltages Vu_pwm, Vv_pwm, and Vw_pwm. According to this structure, voltage necessary to generate the motor-application voltages Vu_pwm, Vv_pwm, and Vw_pwm can be supplied to the PWM inverter 13 instantaneously and thus, the switching operation of the PWM inverter 13 can be facilitated.

In the vector control system according to the first embodiment of the invention, the inverter supply voltage generator varies the inverter supply voltage Vdc such that the greatest and smallest instantaneous values of the motor-application voltages Vu_pwm, Vv_pwm, and Vw_pwm become equal to each other. According to such a structure, since it is only necessary for the PWM inverter 13 to switch only one phase among the three phases to be output, the inverter loss is largely reduced, and the ripple current appearing in the DC current is largely reduced.

In the vector control system according to the first embodiment of the invention, the inverter supply voltage generator utilizes the phase voltage command values vu*, vv*, and vw* as the motor-application voltages Vu_pwm, Vv_pwm, and Vw_pwm to be referred to when the inverter supply voltage Vdc is to be generated. Therefore, the time difference in which the inverter supply voltage Vdc is in synchronization with the motor-application voltages Vu_pwm, Vv_pwm, and Vw_pwm can be minimized.

In the vector control system according to the first embodiment of the invention, the PWM inverter 13 determines the pulse width which is to be output according to the inverter supply voltage command Vdc*. Therefore, even if the inverter supply voltage Vdc is varied in synchronization with the motor-application voltages Vu_pwm, Vv_pwm, and Vw_pwm, the precision of modulation caused by the PWM control can be enhanced.

Second Embodiment

Next, a structure of a vector control system according to a second embodiment of the invention will be explained with reference to FIGS. 6 and 7A–7D.

Structure of Vector Control System

Figure 6:
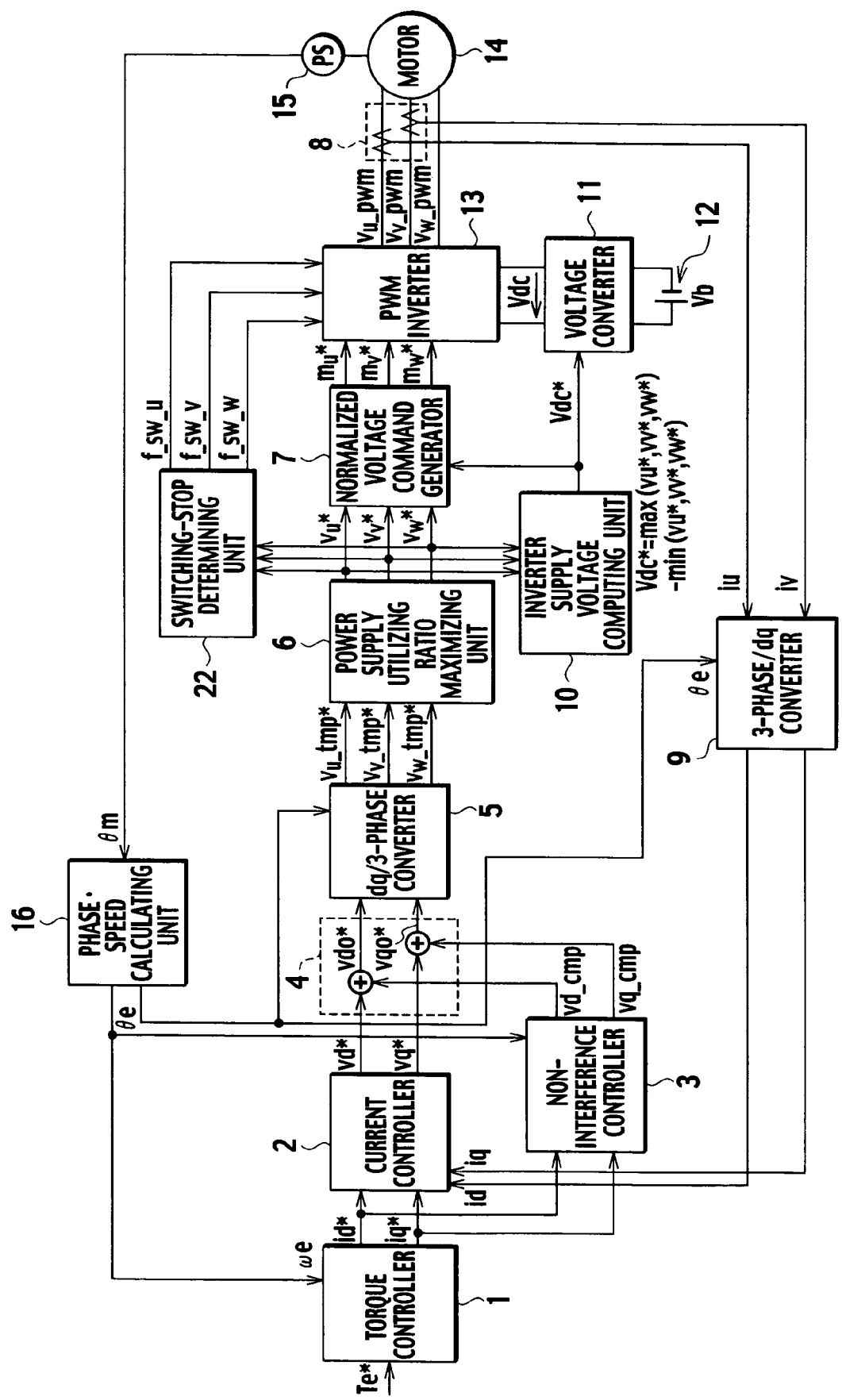
FIG. 6 is a block diagram showing a structure of a vector control system according to a second embodiment of the invention.

In the vector control system according to the second embodiment of the invention, as shown in FIG. 6, a switching-stop determining unit 22 is added to the vector control system of the first embodiment. Thus, only the structure and operation of the switching-stop determining unit 22 will be explained and explanation of other constituent elements will be omitted.

Structure of Switching-stop Determining Unit

The switching-stop determining unit 22 refers to phase voltage command values vu*, vv*, and vw* which are input from the power supply utilizing ratio maximizing unit 6, discriminates a phase having the greatest phase voltage command value and a phase having the smallest phase voltage command value. Based on a result thereof, the switching-stop determining unit 22 inputs flags fsw_u, fsw_v, and fsw_w which designate ON/OFF states of the U-phase, V-phase, and W-phase switching elements to the PWM inverter 13, and controls the PWM inverter 13 such that the switching elements of the half bridge circuits of a phase having the greatest phase voltage command value and a phase having the smallest phase voltage command value are not operated. According to such a structure, as shown in o in FIG. 4C, when the phase voltage command value is the greatest or smallest, the switching operation is prohibited, and the switching operation shown in FIG. 7C can be carried out. In this embodiment, the switching-stop determining unit 22 inputs a flag 0 when only H level inverter output is permitted, inputs a flag 1 when only L (low) level inverter output is permitted, and inputs a flag 2 when both the H level and L level inverter outputs are permitted into the PWM inverter 13.

As apparent from the above explanation, according to the vector control system of the second embodiment of the invention, the switching-stop determining unit 22 controls the PWM inverter 13 such that the switching elements of the phases having the greatest and smallest phase voltage command values are not operated. Therefore, it is possible to avoid unnecessary switching operation caused by erroneous computation, erroneous computation timing, erroneous control, and the like, and it is possible to prevent the enhancing degree of efficiency of the PWM inverter 13 from being reduced.

Third Embodiment

Next, a structure of a vector control system according to a third embodiment of the invention will be explained with reference to FIGS. 8 and 9.

Structure of Vector Control System

Figure 8:
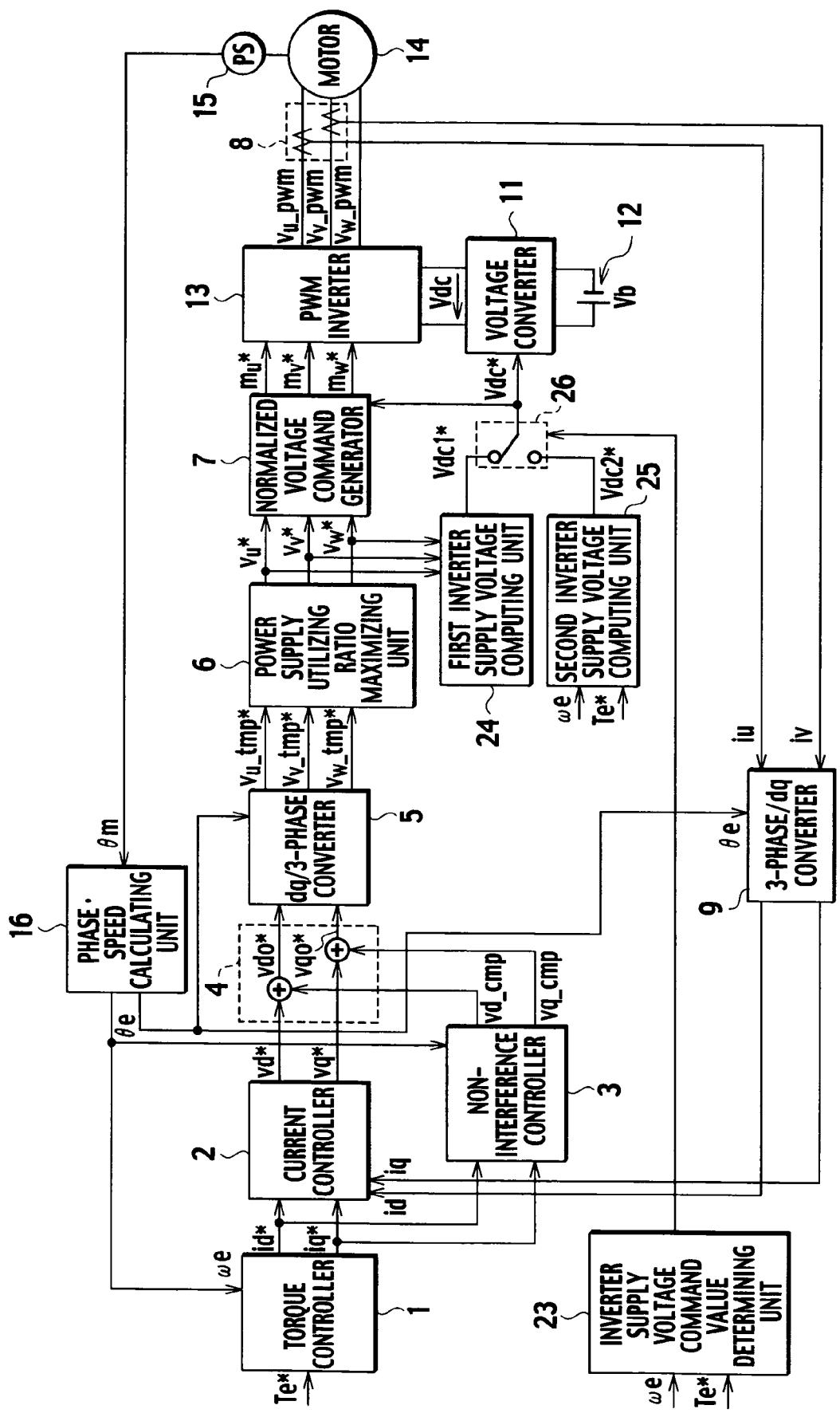
FIG. 8 is a block diagram showing a structure of a vector control system according to a third embodiment of the invention.

In the vector control system according to the third embodiment of the invention, as shown in FIG. 8, the inverter supply voltage computing unit 10 in the vector control system of the first embodiment includes first and second inverter supply voltage computing units 24 and 25, and an inverter supply voltage command value determining unit 23 and a switch circuit 26 are added to the vector control system of the first embodiment. Therefore, only the structures and operations of the inverter supply voltage command value determining unit 23, the first and second inverter supply voltage computing units 24 and 25, and the switch circuit 26 will be explained, and explanation of other constituent elements will be omitted.

The inverter supply voltage command value determining unit 23 computes a command value of the inverter supply voltage based on the torque command Te* and the motor rotation speed ωe, and inputs the command value to the switch circuit 26. This command value is a DC voltage whose magnitude is varied according to output of the IPM motor 14.

The first and second inverter supply voltage computing units 24 and 25 produce an inverter supply voltage command value Vdc1* which is varied in synchronization with the motor-application voltages Vu_pwm, Vv_pwm, and Vw_pwm, and a constant inverter supply voltage command value Vdc2* which is not in synchronization with the motor-application voltages Vu_pwm, Vv_pwm, and Vw_pwm.

The switch circuit 26 switches the inverter supply voltage command value Vdc* which is to be input to the normalized voltage command generator 7 and the voltage converter 11 according to a command value which is input from the inverter supply voltage command value determining unit 23, between the inverter supply voltage command value Vdc1* of the first inverter supply voltage computing unit 24 and the inverter supply voltage command value Vdc2* of the second inverter supply voltage computing unit 25.

Figure 9:
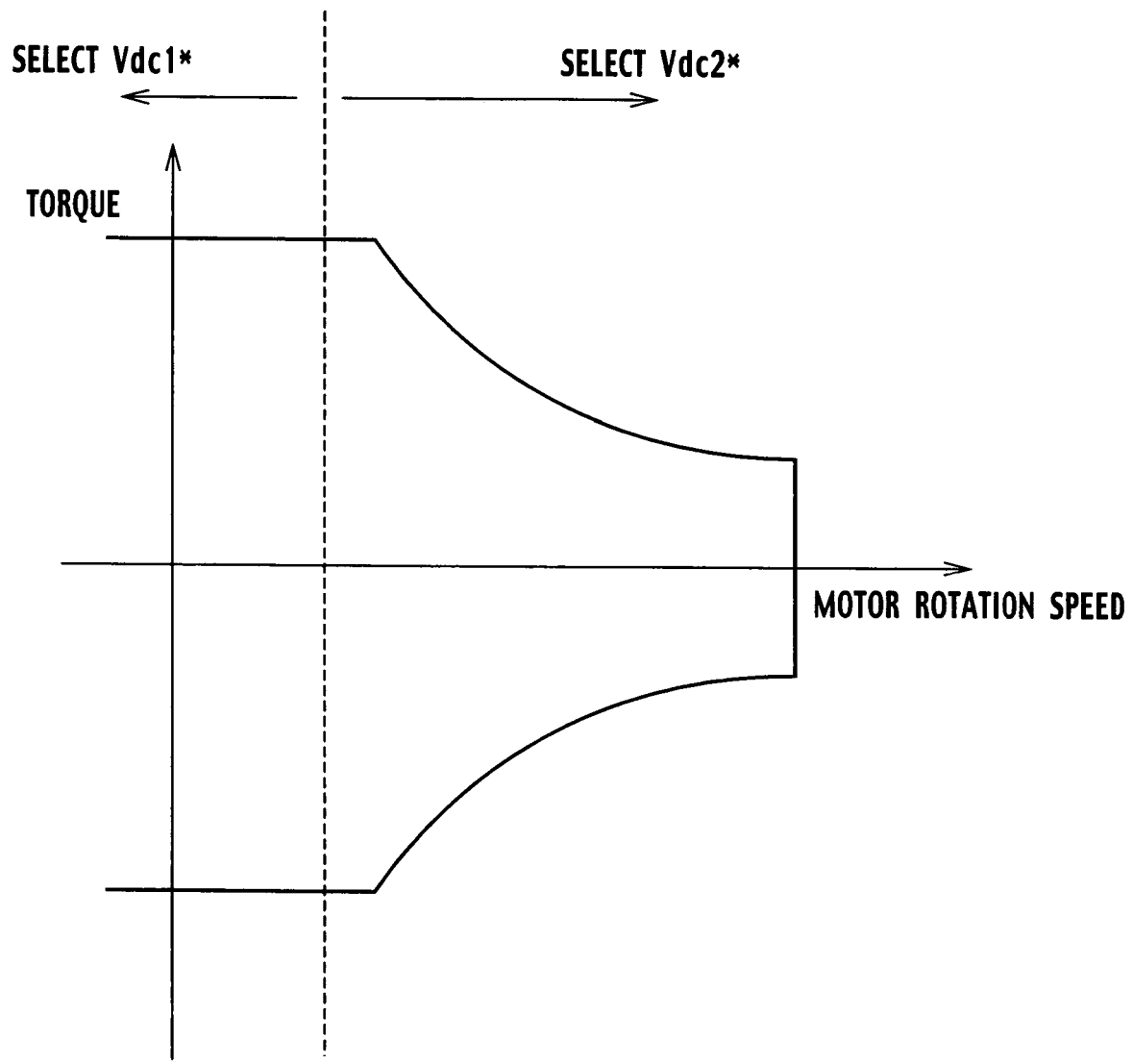
FIG. 9 is a diagram for explaining a process for switching the inverter supply voltage command value according to a driving state of an IPM motor.

According to such a structure, as shown in FIG. 9, the switch circuit 26 is controlled such that the inverter supply voltage command value determining unit 23 selects the inverter supply voltage command value Vdc2* of the second inverter supply voltage computing unit 25 in a low rotation region where the response is important, and selects the inverter supply voltage command value Vdc1* of the first inverter supply voltage computing unit 24 in a high rotation region where requirement of response is not strict. With this control, the inverter supply voltage Vdc can be switched depending upon the operation region where the response of torque is required and the region where the response of torque is not required strongly.

As apparent from the above explanation, according to the vector control system of the third embodiment of the invention, the inverter supply voltage command value determining unit 23 switches between the inverter supply voltage command value Vdc1* which is varied in synchronization with the motor-application voltages Vu_pwm, Vv_pwm, and Vw_pwm, and the constant inverter supply voltage command value Vdc2* which is not in synchronization with the motor-application voltages Vu_pwm, Vv_pwm, and Vw_pwm according to the driving state of the IPM motor 14. Therefore, high torque response can be obtained when necessary while enhancing the efficiency of the PWM inverter 13.

The entire content of a Patent Application No. TOKUGAN 2003-367602 with a filing date of Oct. 28, 2003, is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A motor control device which controls an output of an AC motor by controlling a DC input voltage of an inverter which applies voltage to the AC motor, comprising:
    an inverter supply voltage generator configured to vary the DC input voltage according to a difference between the greatest phase voltage value and the smallest phase voltage value among instantaneous values of phase voltage which is output from each phase of the inverter.

2. The motor control device according to claim 1, wherein the inverter supply voltage generator varies the DC input voltage to a value which is equal to a difference between the greatest phase voltage value and the smallest phase voltage value among instantaneous values of phase voltage which is output from each phase of the inverter.

3. The motor control device according to claim 2, further comprising:
    a switching-stop determining unit which controls the inverter such that a switching operation of a phase corresponding to the greatest phase voltage value and the smallest phase voltage value is prohibited.

4. The motor control device according to claim 1, wherein the inverter supply voltage generator uses a phase voltage command value as the output voltage of the inverter.

5. The motor control device according to claim 1, wherein the inverter comprises a PWM inverter and determines a pulse 10 width using the DC input voltage.

6. The motor control device according to claim 1, further comprising:
    an inverter supply voltage command value determining unit which switches between an operation which varies the DC input voltage in synchronization with an output voltage of the inverter and an operation which brings the DC input voltage into a substantially constant voltage according to a driving state of the AC motor.

7. A motor control method for controlling an output of an AC motor by controlling a DC input voltage of an inverter which applies voltage to the AC motor, comprising the operation of:

varying the DC input voltage according to a difference between the greatest phase voltage value and the smallest phase voltage value among instantaneous values of phase voltage which is output from each phase of the inverter.

* * * * *